April 12, 1955 B. F. WHEELER ET AL 2,706,286

FAULT LOCATING AND INDICATING SYSTEM

Filed Sept. 4, 1951 2 Sheets-Sheet 1

INVENTORS
BENJAMIN F. WHEELER,
JOHN A. COLLINS &
ROBERT J. NORTON
BY Charles H. Brown
ATTORNEY April 12, 1955 B. F. WHEELER ET AL 2,706,286

FAULT LOCATING AND INDICATING SYSTEM

Filed Sept. 4, 1951 2 Sheets-Sheet 2

INVENTORS
BENJAMIN F. WHEELER,
JOHN A. COLLINS &
ROBERT J. NORTON
BY Charles H. Brown
ATTORNEY United States Patent Office 2,706,286

Patented Apr. 12, 1955

2,706,286

FAULT LOCATING AND INDICATING SYSTEM

Benjamin F. Wheeler, Haddonfield, N. J., and Robert J. Norton, Hampstead, Quebec, and John A. Collins, Valois, Quebec, Canada, assignors to Radio Corporation of America, a corporation of Delaware Application September 4, 1951, Serial No. 245,028

4 Claims. (Cl. 340—163)

This invention relates to a fault locating and indicating system, and more particularly to such a system for use in microwave radio relaying equipment.

In the copending Thompson application, Serial No. 205,685, filed January 12, 1951, now Patent No. 2,691,065 dated October 5, 1954, there is disclosed a repeater station for a frequency modulation microwave radio relaying system, the system generally consisting of a plurality of repeater stations intermediate a pair of terminal stations. This repeater station is normally unattended and operates to receive, amplify and retransmit intelligence being sent in both directions along the communication system. As a result of various causes, equipment at such an unattended repeater station may fail and it is quite desirable that such failure or "fault" be made known to personnel at the terminal stations of the system as soon as such fault arises. For this purpose, fault locating equipment is provided as a part of the service unit at the repeater station; this equipment transmits to the system terminal stations, which are normally attended, a code identifying the particular repeater station at which the fault exists and also the type of fault. Such fault locating equipment is indicated as a block labeled SC in the aforementioned copending application.

In the copending Wheeler application, Serial No. 211,942, filed February 20, 1951, now Patent No. 2,653,315 dated September 22, 1953, there is disclosed a terminal station for the frequency modulation microwave radio relaying system. Such station is normally attended and operates to receive and utilize intelligence sent from the opposite end or from any intermediate repeater station of the communication system and also to originate and transmit intelligence toward the opposite end of such system. Fault locating equipment is provided as a part of the service unit at the terminal station; this equipment indicates and records the fault signal transmissions initiated at the faulty repeater station or stations. This fault locating equipment is indicated as a block labeled SC in the said Wheeler application.

An object of the present invention is to devise novel fault locating equipment for a microwave radio relaying system the repeater station unit of which operates to transmit a code identifying the faulty repeater station and the fault and the terminal station unit of which operates to indicate and record the fault signal transmissions initiated at repeater stations.

Another object is to devise a fault indicating system wherein a plurality of repeater stations utilize a common modulating frequency for fault-indicating transmission and wherein means is provided at the repeater stations to prevent transmission of fault-indicating signals from two or more repeater stations at the same time.

The foregoing and other objects of the invention will be best understood from the following description of an exemplification thereof, reference being had to the accompanying drawings, wherein.

Briefly, this invention operates as follows: In response to a fault or to the failure of the transmitter, receiver, or other equipment at any one or more of a plurality of repeater stations in a communication system, code transmitting apparatus at the particular repeater station where the fault has occurred is automatitions of the system a time division code identifying the faulty station and the type of fault that has occurred. At the terminal stations, equipment is automatically set into operation when a fault has occurred, to indicate and record the fault signal transmissions initiated at the repeater stations. A "lockout" arrangement is provided at the repeater stations, to prevent transmission of fault indicating signals from more than one repeater station at a time. A commutator at the terminal station is driven in substantial synchronism with a commutator at the transmitting repeater station. These commutators are so constructed as to allow a considerable difference in speeds of the two driving motors, while yet providing a correct indication at the terminal station, by operation of the commutator thereat.

Figure 1:
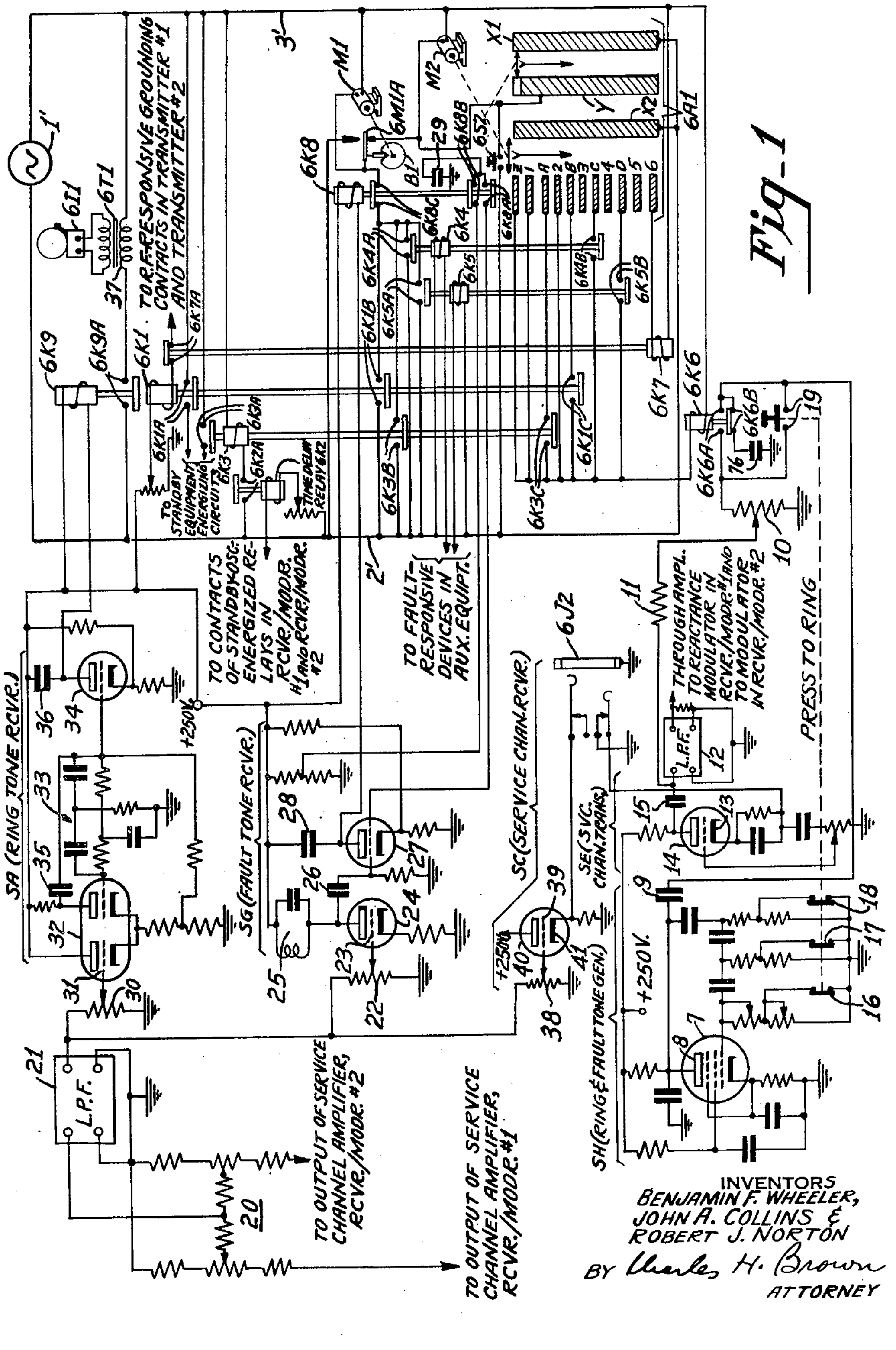
Fig. 1 is a detailed circuit diagram of the repeater station fault transmitting equipment.

Fig. 1 illustrates the fault transmitting equipment at a repeater station of a microwave communication system, according to this invention. This equipment operates to transmit signals identifying the particular repeater station at which a failure or fault has occurred, plus information as to the type of failure. Generally, each repeater station includes two receiver/modulator units, herein referred to as receiver/modulator #1 and receiver/modulator #2, and two transmitter units, herein referred to as transmitter #1 and transmitter #2. These units are preferably arranged as illustrated in Fig. 1 of the aforementioned Thompson application. In brief, receiver/modulator #1 and transmitter #1 are coupled essentially in cascade and function to receive signals from one direction, such as west, and to amplify and retransmit the same in the opposite direction, east. Similarly, receiver/modulator #2 and transmitter #2 are coupled essentially in cascade and function to receive signals from the east and to amplify and retransmit the same toward the west. In going through the repeater station from west to east three frequency conversions take place, and as a result the signals retransmitted toward the east are at a slightly different frequency from the signals received from the west. Similarly, in going through the repeater station from east to west three frequency conversions take place, and as a result the signals retransmitted toward the west are at a slightly different frequency from the signals received from the east. This is explained in more detail in the aforementioned Thompson application.

Figures 2, 3:
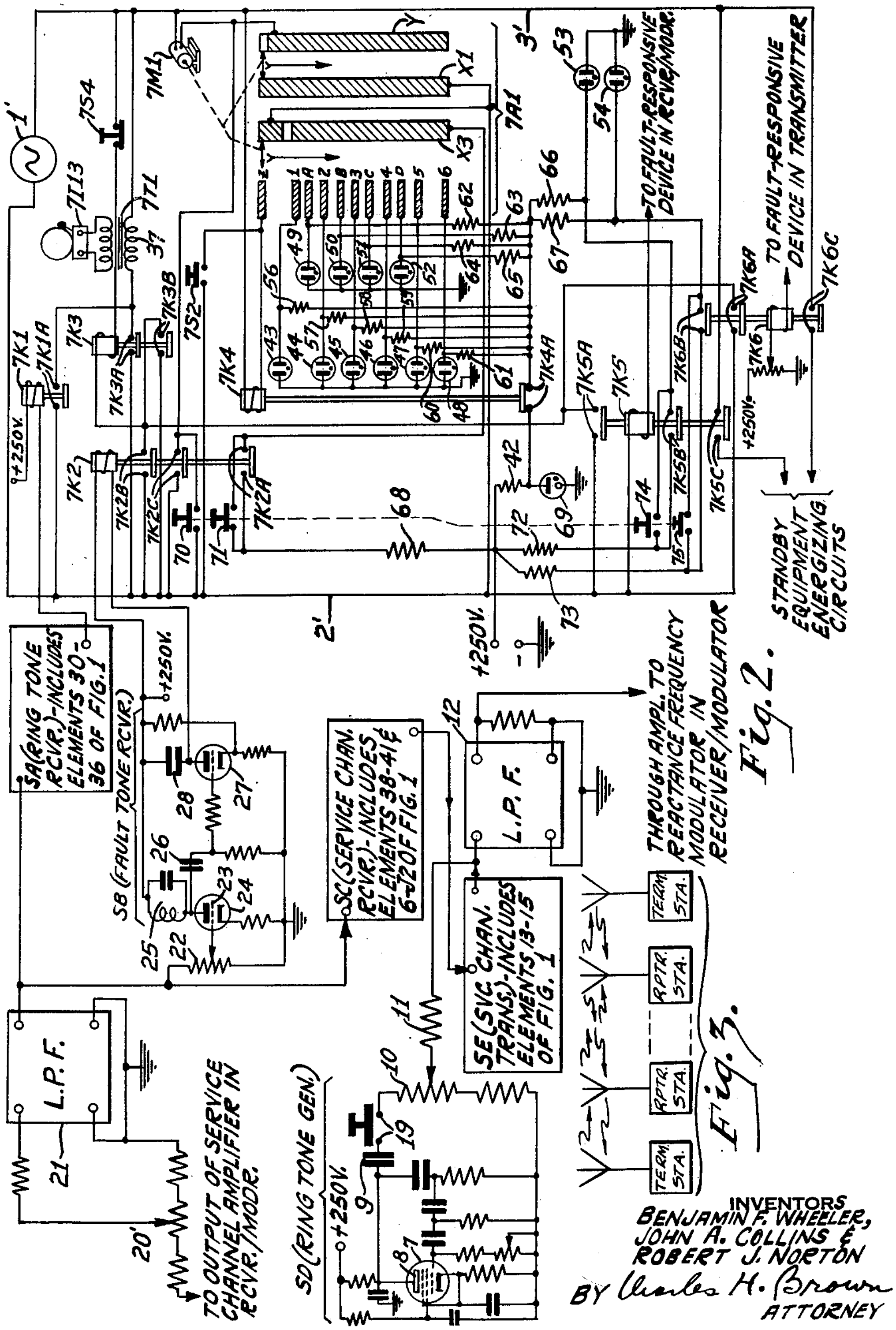
Fig. 2 is a detailed circuit diagram of the terminal station fault indicating equipment.
Fig. 3 is a block diagram of a radio relaying system in which the invention is useful.

Fig. 3 diagrammatically illustrates a radio relaying system of the general type previously described, including a pair of terminal stations and a plurality of intermediate repeater stations for relaying intelligence in both directions between the terminal stations.

Each of the two transmitters at a repeater station, #1 and #2, includes a separate microwave oscillator and a separate microwave or radio frequency amplifier, which in each case may be thought of as constituting the heart of the respective transmitter. These oscillators supply the local heterodyning energy for the first and third frequency conversions in the repeater.

Each of the two receiver/modulators at a repeater station, #1 and #2, includes a separate heterodyne oscillator for supplying the local heterodyning energy for the second frequency conversion, which converts the first intermediate frequency (30 mc.) to a second intermediate frequency (70 mc.) which is amplified and thereafter heterodyned up, in the third frequency conversion, to a microwave frequency for retransmission. In order to enable transmission from the repeater station of intelligence originating thereat, each of these least-named heterodyne oscillators may be frequency modulated by such intelligence, and for this purpose each such oscillator is provided with a respective reactance modulator to which such intelligence is applied. One mode of utilization of these modulators will become clearer as the description proceeds.

Each of the two receiver/modulators at a repeater station, #1 and #2, includes a separate stand-by oscillator which is energized automatically, in response to failure of a received signal in its respective receiver/modulator. The output of each stand-by oscillator beats with the output of the respective heterodyne oscillator to produce an intermediate frequency wave of the same frequency as that resulting from the mixing of the received signal and the heterodyne oscillator output. This "stand-by" or "emergency" intermediate frequency wave is amplified and thereafter heterodyned up to the microwave frequency for retransmission in the same way as the regular intermediate frequency wave, thus providing a microwave carrier for transmission in each direction from the repeater station even though one or both of the receivers thereat has failed. This carrier, which is derived in part from the frequency modulated heterodyne oscillator at the repeater station, may be made to carry frequency modulated intelligence originating at such repeater station.

Reference may be had to the said Thompson application for a more detailed description of repeater stations of the type generally referred to above.

Now referring to Fig. 1, the fault transmitting equipment at a repeater station consists of five electronic circuits, designated by the symbols SA (ring tone receiver), SG (fault tone receiver), SC (service channel receiver), SE (service channel transmitter) and SH (ring and fault tone generator). The first three of these circuits are in the receiving branch of the repeater station and the last two are in the transmitting branch. On the right-hand side of Fig. 1 are shown relays and a commutator system, responsive to failures or faults in the equipment at the repeater station, for automatically transmitting fault signals indicative of such faults.

Now describing Fig. 1 in detail, a source 1' of alternating current, such as the ordinary 115-volt power supply, furnishes this alternating voltage to opposite bus conductors 2' and 3', which are connected to opposite terminals of the source. The lower end of the operating coil of relay 6K1 is connected through the normally-closed contacts 6K7A of relay 6K7 to the radio-frequency-responsive grounding contacts in transmitter #1 and transmitter #2 of the repeater station, while the upper end of this relay coil is connected to the positive side of the direct current potential supply of 250 volts, for example, through a potentiometer as illustrated. The grounding contacts in the transmitters may be, for example, of the type illustrated at RFR in the aforesaid Thompson application, and operate to connect the lower end of the coil of 6K1 to ground in response to the failure of either transmitter #1 or of transmitter #2, or of both. Thus, when one or both transmitters at the repeater station fail, relay 6K1 is energized to close its sets of normally-open contacts 6K1A, 6K1B and 6K1C. The closing of contacts 6K1A completes an energization circuit from bus 3' to certain auxiliary or stand-by equipment, such as a stand-by transmitter. The closing of contacts 6K1B sets up a circuit for energization of motor M1 as follows: Bus conductor 2', contacts 6K1B, normally-closed contacts 6K8C of relay 6K8, motor M1, bus conductor 3'. A circuit is also set up for the energization of motor M2, as follows: Bus conductor 2', contacts 6K1B, contacts 6K8C, movable arm of cam-operated switch 6M1A, the normally-closed lower contact of switch 6M1A, motor M2, bus conductor 3'. Motor M1, by means of the cam B1 which it rotates, closes the movable arm of cam-operated switch 6M1A on the upper contact thereof to keep such motor energized through a circuit from bus 2' through the upper contact and movable arm of switch 6M1A and motor M1, to bus 3'. Motor M1, by means of the cam B1 which it rotates, opens the lower contact of cam-operated switch 6M1A in order to stop motor M2 after the latter completes one revoltuion (it will be remembered that motor M2 is initially energized through the lower contact of switch 6M1A).

Motor M2 rotates the two sets of brushes of commutator 6A1 at a rate which requires about twelve seconds for a complete revolution, sending out code impulses during this time in a manner to be described hereinafter. Motor M2 is caused to be energized for this one complete revolution of commutator 6A1, even though the lower contact of switch 6M1A has been opened by cam B1, in the following manner. The right-hand set of brushes driven by motor M2 connects together commutator segments Y and X1. Segment X1 is conductive throughout its circumference, while segment Y is conductive for most but not all of its circumference, having a small non-conductive portion between the ends of the conductive portion. Therefore, as soon as the right-hand set of brushes reaches the conductive portion of commutator segment Y, an energization circuit is established as follows for motor M2: Bus 3', motor M2, commutator segment Y, right-hand set of commutator brushes, commutator segment X1, bus 2'. As soon as the right-hand set of brushes reaches the non-conductive portion of commutator segment Y (after one revolution of commutator 6A1), this motor energization circuit is broken and motor M2 stops, since the lower contact of switch 6M1A is now open. Motor M2 cannot be again energized to drive commutator 6A1 until motor M1 has completed its cycle or one revolution of cam B1 about four minutes later, closing the lower contact of switch 6M1A by means of cam B1.

The lower end of the operating coil of time delay relay 6K2 is connected to bus 2', while the upper end of this coil is connected to the contacts of certain relays in the two receiver/modulators which are energized by the respective stand-by oscillators each of which, as above stated, is energized in response to failure of the respective receiver. These stand-by-oscillator-energized relays may be, for example, of the type illustrated at SS in the aforementioned Thompson application, and operate, when energized in response to the energization of the respective stand-by oscillator when the respective receiver fails, to connect the lower end of the coil of 6K2 to bus 3'. Thus, when one or both receivers at the repeater station fails, relay 6K2 is energized and after a certain time delay closes its normally-open contacts 6K2A. Contacts 6K2A are in series with the operating coil of relay 6K3 between buses 2' and 3', so that closing of contacts 6K2A causes relay 6K3 to be energized, closing its sets of normally-open contacts 6K3A, 6K3B and 6K3C. The closing of contacts 6K3A completes an energization circuit from bus 3' to certain auxiliary or stand-by equipment, for example a stand-by receiver. Contacts 6K3B are connected directly in parallel with contacts 6K1B previously mentioned, so that the closing of contacts 6K3B sets up energizing circuits for motors M1 and M2 in exactly the same manner as previously described in connection with contacts 6K1B. Each of motors M1 and M2 will then go through its complete cycle in exactly the same way as described in connection with contacts 6K1B.

The upper end of the operating coil of relay 6K4 is connected to bus 2', while the lower end of this coil is connected to a fault-responsive device in certain auxiliary equipment, not shown. This device operates, in response to the appearance of a fault in this auxiliary equipment, to connect the lower end of the coil of 6K4 to bus 3'. Thus, when a fault occurs in this equipment, relay 6K4 is energized, to close its sets of normally-open contacts 6K4A and 6K4B. Contacts 6K4A are connected directly in parallel with contacts 6K1B previously mentioned, so that the closing of 6K4A sets up energizing circuits for motors M1 and M2 in exactly the same manner as previously described in connection with contacts 6K1B. Each of motors M1 and M2 then goes through its complete cycle in exactly the same way as described in connection with contacts 6K1B.

The upper end of the operating coil of relay 6K5 is connected to bus 2', while the lower end of this coil is connected to a fault-responsive device in certain other auxiliary equipment, not shown. This device operates, in response to the appearance of a fault in this other auxiliary equipment, to connect the lower end of the coil of 6K5 to bus 3'. Thus, when a fault occurs in this equipment, relay 6K5 is energized, to close its sets of normally-open contacts 6K5A and 6K5B. Contacts 6K5A are connected directly in parallel with contacts 6K1B previously mentioned, so that the closing of 6K5A sets up energizing circuits for motors M1 and M2 in exactly the same manner as previously described in connection with contacts 6K1B. Each of motors M1 and M2 then goes through its complete cycle in exactly the same way as described in connection with contacts 6K1B.

To summarize the operation so far described, faults in the transmitter, in the receiver, or in certain auxiliary equipment desired to be protected, operate one or more of the relays 6K1, 6K2, 6K3, 6K4 or 6K5. Energization of any one or more of these relays causes energization of motors M1 and M2, and each of these motors goes through its complete cycle, that of M2 taking about twelve seconds and that of M1 taking about four minutes, for example.

A test switch 6S2, normally open, is connected in a branch circuit, directly in series with motor M2 between buses 2′ and 3′. Closing of this switch completes an obvious energization circuit for motor M2. The closing of switch 6S2 also completes an energization circuit for motor M1, as follows: Bus 2′, switch 6S2, the lower contact of switch 6M1A, movable arm of switch 6M1A, motor M1, bus 3′. Therefore, the closing of test switch 6S2 causes energization of both motors M1 and M2, causing them to go through their respective cycles of operation at will for test purposes.

The transmitting portion of the fault locating repeater station equipment includes a phase-shift-type audio oscillator SH comprising a pentode 7 which is connected in a more or less conventional manner to operate as a phase-shift-type audio frequency oscillator. This oscillator when unloaded in response to the energization of relay 6K6 oscillates at a frequency of 2800 cycles. Normally, the output circuit of this oscillator goes from anode 8 of pentode 7 through a coupling capacitor 9 and a pair of normally-closed contacts 6K6B of a keying relay 6K6, to ground through a loading capacitor 76. Capacitor 76 effectively heavily loads the oscillator SH and thus no 2800-cycle oscillations are developed until relay 6K6 is energized to open contacts 6K6B and remove the load 76. A circuit may be traced from pentode anode 8 through capacitor 9 and a pair of normally-open contacts 6K6A of relay 6K6 to a potentiometric resistor 10, the 2800-cycle audio frequency appearing across resistor 10 when contacts 6K6A are closed and contacts 6K6B are opened. A movable tap on resistor 10 is connected through resistor 11 to the input side of a low pass filter 12. The keyed audio frequency output of oscillator SH is combined with the output of the transmitter unit of a telephone handset (not shown) which may be plugged into jack 6J2 which in turn is coupled to the cathode 13 of an amplifying triode 14 constituting amplifier stage SE for the service channel transmitter; the combination of these two outputs is effected at the input of filter 12 via a coupling capacitor 15 connected to the anode of triode 14. The telephone handset may be as indicated at TH in the aforementioned Thompson application. The output of filter 12 is passed on to the transmission circuits, for intelligence of local origin, which are provided at the repeater station of the aforementioned Thompson application, and which as previously stated consist of a separate reactance modulator for the corresponding heterodyne oscillator of each receiver/modulator. Thus, the output of filter 12 is used to frequency modulate the microwave energy going out from each repeater station in each of the two opposite directions. Filter 12 is a low pass filter which prevents transmission therethrough of any signals having frequencies higher than 3000 cycles; signals of such higher frequencies would interfere with the multiplexed carrier traffic flowing through the repeater station or originating thereat. The keyed audio frequency output of oscillator SH which, as will become clearer hereinafter, provides a fault-indicating time division code identifying the faulty repeater station and the type of fault, is thus modulated onto the microwave energy going out from the repeater station, as is also any telephonic intelligence originating at the repeater station.

By means of a plurality of ganged pushbutton switches 16, 17 and 18, which normally short-circuit certain of the resistors in the phase-shift circuit of oscillator SH, this oscillator may in effect be energized to develop 300-cycle oscillations when the pushbutton is operated. Capacitor 76 does not load the oscillator heavily enough to prevent it from developing 300-cycle oscillations. The pushbutton also includes a pair of normally-open contacts 19 connected across the oscillator keying contacts 6K6A, so that when the pushbutton is operated contacts 19 are closed to complete the circuit between the anode 8 of oscillator SH and the input of filter 12. When the pushbutton is operated, then, a 300-cycle tone is generated by oscillator SH and this tone is transmitted through filter 12 to the modulators, by way of which it is sent out from the repeater station as a ringing signal or ring tone, to attract the attention of other operators along the communication system.

The initiation of operation of motor M2, in response to the appearance of a fault at the repeater station, and the consequent rotation of commutator 6A1 through one revolution, have been previously described. The left-hand set of brushes of commutator 6A1 connects each one of a plurality (here shown as eleven in number) of conducting segments successively to a single conducting segment X2 which is connected to bus 2′. Thus, the segments numbered Z, 1, A, 2, B, 3, C, 4, D, 5 and 6 are connected in that order to segment X2.

Segment Z, the first segment to be connected by means of the left-hand brushes to segment X2, serves to initiate the operation of the receiving commutator at the terminal stations, as will later be described. When the brushes connect segment Z to segment X2, a circuit for energization of relay 6K6 is completed as follows: Bus 2′, segment X2, segment Z, operating coil of relay 6K6, bus 3′. It will be noted that the lower end of the operating coil of 6K6 is connected to bus 3′. The energization of relay 6K6 causes its normally-open contacts 6K6A to be closed and its normally-closed contacts 6K6B to be opened, removing load 76 from the oscillator SH (which allows it to develop 2800-cycle oscillations) and connecting the oscillator output circuit to the input of filter 12 and causing the transmission of this tone from the repeater station, by frequency modulation, in both directions. Whenever contacts 6K6A are closed (and contacts 6K6B are opened) by the energization of relay 6K6, a 2800-cycle audio frequency fault tone is sent out from the repeater station of Fig. 1. A tone pulse generated by oscillator SH, the length of which pulse is determined by the length of time that segment Z is connected to segment X2 by the left-hand commutator brushes, is initially transmitted from the repeater station.

Six commutator segments, numbered 1, 2, 3, 4, 5 and 6, are assigned for station identification. Using two of these segments at a time in various combinations, fifteen code combinations can be set up to provide a two-unit station code for identification of fifteen repeater stations; these combinations may be represented in the following way: 12, 13, 14, 15, 16, 23, 24, 25, 26, 34, 35, 36, 45, 46 and 56. To set up these codes, the correspondingly-numbered segments of commutator 6A1 are connected to the upper end of the winding of 6K6. Thus, the setting for station code 12 is illustrated in Fig. 1, since commutator segments 1 and 2 are connected to the 6K6 relay winding. Similarly, for code 13, commutator segments 1 and 3 would be connected to the upper end of the 6K6 winding, and so on for setting up other codes at other repeater stations. In this way, the particular repeater station which is transmitting a fault indication can be easily identified at the terminal stations, in a manner that will become clearer as the description proceeds. A three-unit station code, using three numbered commutator segments at a time for identification of 20 repeater stations can be set up with the following combinations: 123, 124, 125, 126, 134, 135, 136, 145, 146, 156, 234, 235, 236, 245, 246, 256, 345, 346, 356 and 456.

When the brushes connect segment 1 to segment X2, relay 6K6 is energized through a circuit as follows: Bus 2′, segment X2, segment 1, winding of 6K6, bus 3′. Relay 6K6 being energized, an audio frequency tone pulse is again sent out or transmitted from the repeater station to represent the first element, 1, of the station code #12.

Four commutator segments interleaved with segments 1–6 and designated A, B, C and D are used to identify the particular fault at the transmitting repeater station. Thus, as previously described, if there is a fault in the receiver/modulator at the repeater station relays 6K2 and 6K3 are energized to close contacts 6K3C, which are associated with commutator segment A. If contacts 6K3C are closed due to a receiver fault, the connection of segment A to segment X2 by the left-hand commutator brushes completes an energization circuit for relay 6K6 as follows: Bus 2′, segment X2, segment A, contacts 6K3C, winding of 6K6, bus 3′. Relay 6K6 being energized, an audio frequency tone pulse is sent out or transmitted from the repeater station to denote a fault in the receiver thereat.

When the left-hand brushes connect segment 2 to segment X2, relay 6K6 is energized through a circuit as follows: Bus 2′, segment X2, segment 2, winding of 6K6, bus 3′. Relay 6K6 being energized, an audio frequency tone pulse is again sent out or transmitted from the repeater station to represent the final element, 2, of the station code #12.

As previously described, if there is a fault in the transmitter at the repeater station relay 6K1 is energized to close contacts 6K1C, which are associated with commutator segment B. If contacts 6K1C are closed due to a transmitter fault; the connection of segment B to segment X2 by the left-hand commutator brushes completes an energization circuit for relay 6K6 as follows: Bus 2', segment X2, segment B, contacts 6K1C, winding of 6K6, bus 3'. Relay 6K6 being energized, an audio frequency tone pulse is sent out or transmitted from the repeater station to denote a fault in the transmitter thereat.

Similarly, if the particular station-identifying code combination called for a connection to commutator segment 3, relay 6K6 would be energized when the left-hand brushes connect segments 3 and X2 to transmit an audio frequency tone pulse representing one element, 3, of such code combination.

As previously described, if there is a fault in one piece of auxiliary equipment being protected at the repeater station relay 6K4 is energized to close contacts 6K4B, which are associated with commutator segment C. If contacts 6K4B are closed due to an auxiliary equipment fault, the connection of segment C to segment X2 by the left-hand commutator brushes completes an energization circuit for relay 6K6 as follows: Bus 2', segment X2, segment C, contacts 6K4B, winding of 6K6, bus 3'. Relay 6K6 being energized, an audio frequency tone pulse is sent out or transmitted from the repeater station to denote a fault in the auxiliary equipment thereat.

It is desired to be pointed out that, if there is no connection from certain station-identifying commutator segments to 6K6 winding (as is the case with segments 3, 4, 5 and 6 in Fig. 1), or if any of the relay contacts 6K3C, 6K1C, 6K4B or 6K5B are not closed by the energization of the corresponding relays, relay 6K6 will remain open-circuited or unenergized during the passage of the left-hand commutator brushes over such "dead" segments and no audio frequency tone pulse will be sent out from the repeater station during such times, since then contacts 6K6A remain open to disconnect the fault tone generator SH from the input of filter 12 and contacts 6K6B remain closed to leave loading capacitor 76 connected to the oscillator SH.

As previously described, if there is a fault in another piece of auxiliary equipment being protected at the repeater station relay 6K5 is energized to close contacts 6K5B, which are associated with commutator segment D. If contacts 6K5B are closed due to such other auxiliary equipment fault, the connection of segment D to segment X2 by the left-hand commutator brushes completes an energization circuit for relay 6K6 as follows: Bus 2', segment X2, segment D, contacts 6K5B, winding of 6K6, bus 3'. Relay 6K6 being energized, an audio frequency tone pulse is sent out or transmitted from the repeater station to denote a fault in this other auxiliary equipment thereat.

The upper end of the operating winding of relay 6K7 is connected to any one of the commutator segments numbered 3, 4, 5, or 6 which is not used for the station-identifying code; it is shown connected to segment 6 in Fig. 1. The lower end of 6K7 winding is connected to bus 3'. When the left-hand commutator brushes connect segment 6 to segment X2, relay 6K7 is energized through a circuit as follows: Bus 2', segment X2, segment 6, winding of 6K7, bus 3'. Energization of relay 6K7 causes opening of its normally-closed contacts 6K7A, which are in a series circuit with the winding of relay 6K1. The energization of relay 6K7 thus opens contacts 6K7A to deenergize or reset relay 6K1, which would otherwise "lock up," due to the particular type of relay arrangements employed at transmitter #1 and transmitter #2, either of which can supply the grounding contact for 6K1.

To summarize the action described since the last summary, by means of relay 6K6 (which is selectively operated or energized by the various commutator segments) a series of fault tone pulses, supplied from oscillator SH, are transmitted. These ton pulses transmitted are at a frequency of about 2800 cycles. One set of pulses is transmitted and a repeat set of pulses cannot be transmitted until motor M1 completes its cycle of about four minutes and closes switch 6M1A on its lower contact. The six numbered commutator segments 1, 2, 3, 4, 5 and 6 are assigned the job of station identification, to provide an indication which will ordinarily detect incorrect transmissions caused by circuit noise. A station-identifying code may consist of either two or three tone transmissions out of the six that are possible. Commutator segments A, B, C and D are used to indicate the particular type of fault occurring at the repeater station. Segment A is used to indicate receiver failure, segment B transmitter failure and segments C and D any other types of failure desired by the user to be indicated, such as auxiliary equipment failure. Thus, the repeater station unit described transmits a time division code identifying the faulty repeater station and the type of fault existing thereat.

Since as many as fifteen or twenty repeater stations may be connected into a communication system, it is entirely possible that two or more such stations may attempt to transmit fault-indicating signals at the same time. This would, of course, result in incorrect indications at the terminal stations. To prevent this from occurring, a "lock out" arrangement is provided according to this invention, whereby transmission of fault-indicating signals from two or more repeater stations at the same time is prevented. Contacts 6K8C of relay 6K8 are normally closed but are arranged in series between bus 2' and motors M1 and M2; energization of relay 6K8 opens its contacts 6K8C to open the energizing circuit for such motors, thereby preventing operation of these motors as long as relay 6K8 is energized.

The outputs of the two respective service channel amplifiers in receiver/modulators #1 and #2 (the amplifiers indicated at YY and YY' in the aforementioned Thompson application) are applied through a resistor network 20 to the input of a low pass filter 21, which serves to cut out any frequencies higher than 3000 cycles which may be present due to multiplex transmission along the system. Each respective service channel amplifier is supplied through a discriminator with a sample of the frequency modulated intermediate frequency intelligence passing through the corresponding receiver/modulator of the repeater station.

The output of filter 21 is fed through a potentiometric variable input arrangement 22 to the control grid 23 of a triode 24, which is connected to act as a selective vacuum tube amplifier, tuned through the action of a resonant anode circuit 25 to be responsive to the 2800-cycle tone frequency used for fault indications. Triode 24 constitutes part of the fault tone receiver SG, which is a selective vacuum tube amplifier and relay circuit. The anode of tube 24 is connected through a coupling capacitor 26 to the grid of an amplifying vacuum tube 27 in the anode circuit of which is the operating winding of relay 6K8 previously mentioned; a capacitor 28 is connected across this relay winding. Reception of a 2800-cycle signal from some other repeater station of the communication system which is transmitting fault indicating signals causes sufficient current to flow in the anode circuit of tube 27 to energize relay 6K8. The energization of relay 6K8 opens its contacts 6K8C, preventing energization of motors M1 and M2 and consequently preventing tone transmissions from the station of Fig. 1, as long as another station is transmitting fault-indicating tone; this is true since relay 6K8 is energized in response to recepton of the 2800-cycle tone by the repeater station of Fig. 1 and since contacts 6K8C are in series in the motor energization circuits.

Relay 6K8 is provided with a pair of normally-closed contacts 6K8B in series with a capacitor 29 between a postiive potential terminal and ground. Relay 6K8 also has a pair of normally-open contacts 6K8A connected in series between the grid of tube 27 and the ungrounded side of capacitor 29. Contacts 6K8A and 6K8B, in conjunction with the capacitor 29 at the junction of these contacts, serve to delay the release of relay 6K8 for a sufficiently long period of time to permit the other repeater station or stations to complete their fault tone coded transmissions before the station of Fig. 1 begins its fault tone transmission. Such delay is necessary since relay 6K8 may be energized only intermittently due to the coded character of the fault tone transmissions from other repeater stations.

Electronic circuit SA, the ring tone receiver, is also coupled to the output of filter 21 by way of a potentiometric input arrangement 30 coupling such filter output to the control grid 31 of the first stage of double triode 32, which is connected as a cathode-coupled two-stage amplifier. Triode 32 is connected as a selective amplifier tuned to 300 cycles, the ringing frequency, the selective circuit consisting of a parallel-T RC network 33 connected as a feedback element in the second section of the twin triode 32. Triode 34, coupled to the output of the second section of triode 32 by means of a coupling capacitor 35, is biased to operate as a rectifier and has the operating winding of relay 6K9 in its anode circuit. A capacitor 36 is connected across this relay winding. Relay 6K9 carries a pair of normally-open contacts 6K9A which are connected in series with the primary 37 of a buzzer or bell transformer 6T1 between buses 2′ and 3′. In response to the reception of a 300-cycle ringing signal at the repeater station, tube 34 draws sufficient current to energize relay 6K9, closing its contacts 6K9A and operating the buzzer or bell 6I1 for atracting the attention of operators or maintenance men at the repeater station.

The final electronic circuit of the receiving branch is SC, the service channel receiver. This circuit is coupled to the output of filter 21 by way of a potentiometric input arrangement 38 coupling such filter output to the control grid 39 of a triode 40, which is connected to act as a cathode follower amplifier stage. The cathode 41 of this tube is connected to the receiver unit of a telephone handset (not shown) at jack 6J2. Such telephone handset may be as indicated at TH in the aforementioned Thompson application.

Fault-indicating and station-identifying coded tone pulses transmitted from the service unit of Fig. 1, which is located at an unattended repeater station, are received at the system terminal stations, which are attended, by means of terminal station service units one of which is illustrated in Fig. 2, a separate Fig. 2 service unit being provided at each of the terminal stations of the system. Generally, elements in Fig. 2 which are the same as those in Fig. 1 are denoted by the same reference numerals. Electronic circuits SA, SC and SE are duplicates of those in Fig. 1, so for purposes of simplification are illustrated merely as blocks in Fig. 2.

Now referring to Fig. 2 in detail, the output of the service channel amplifier in the receiver/modulator of a terminal station (an amplifier such as indicated at YY in the aforementioned Wheeler application, which describes a complete terminal station used in a typical FM microwave communication system) is applied through a resistor network 20′ to the input of low pass filter 21. The said service channel amplifier is supplied through a discriminator with a sample of the frequency modulated intermediate frequency intelligence being received by the receiver/modulator of a terminal station.

The ring tone receiver circuit SA, which is selective to the ringing frequency of 300 cycles, is coupled to the output of filter 21. The operating winding of relay 7K1 corresponds to that of relay 6K9 in Fig. 1 and is connected in the anode circuit of the final rectifier in ring tone receiver SA. Relay 7K1 carries a pair of normally-open contacts 7K1A which are connected in series with the primary 37 of a buzzer or bell transformer 7T1 between buses 2′ and 3′. In response to the reception of a 300-cycle ringing signal at the terminal station, relay 7K1 is energized, closing its contacts 7K1A and operating the buzzer or bell 7I13 for attracting the attention of operators or maintenance men at a terminal section.

Circuit SC, the service channel receiver amplifier, is coupled to the output of filter 21 and the output of this circuit is connected to the receiver unit of a telephone handset (not shown) which may be as indicated at TH in the aforementioned Wheeler application.

Since a terminal station (attended) is not required to transmit fault indications, the ring tone transmitting generator SD is an audio oscillator of the phase shift type which is arranged to generate only a 300-cycle tone for ringing purposes. The output of this oscillator is fed from the anode 8 of pentode 7 through a coupling capacitor 9 and through a pair of normally-open contacts 19 of a pushbutton switch to a potentiometric resistor 10, the 300-cycle ringing frequency appearing across resistor 10 when contacts 19 are closed. A movable tap on resistor 10 is connected through resistor 11 to the input side of low pass filter 12. The output of the transmitter unit of the telephone handset is coupled through a service channel transmitter amplifier SE to the input of filter 12. The output of filter 12, composited 300-cycle ringing frequency from oscillator SD and speech from the telephone handset, is passed on to the intelligence transmission circuit provided at the terminal station of the aforesaid Wheeler application, which circuit includes a reactance modulator for the 40-megacycle heterodyne oscillator of the terminal station receiver/modulator. Thus, the output of filter 12 is used to frequency modulate the microwave energy going out from the terminal station. The 300-cycle ringing frequency may be modulated onto the microwave carrier going out from the terminal station, as also may be any telephonic intelligence originating at the terminal station.

Generally, the fault tone receiver SB is similar to fault tone receiver SG in Fig. 1. However, the 2800-cycle selective receiving amplifier SB is not provided with the time delay circuit, including capacitor 29 and relay contacts 6K8A and 6K8B, of receiving amplifier SG in the repeater station, since it is necessary that the anode circuit relay 7K2 of fault tone receiver SB in the terminal station respond to all tone pulses sent out from the repeater stations. The output of filter 21 is fed through a potentiometric variable input arrangement 22 to the control grid 23 of triode 24, connected to act as a selective amplifier tuned to the 2800-cycle tone frequency used for fault transmissions. The operating winding of relay 7K2, previously mentioned, is in the anode circuit of vacuum tube 27.

Reception of a 2800-cycle fault tone signal from any one of the repeater stations (produced thereat as a result of the engagement of the brushes of commutator 6A1 with commutator segment Z) causes sufficient current to flow in the anode circuit of tube 27 to energize relay 7K2, closing its sets of normally-open contacts 7K2A, 7K2B and 7K2C. Closing of contacts 7K2B completes an energization circuit for the operating winding of relay 7K3, as follows: Bus 2′, contacts 7K2B, winding of 7K3, normally-closed pushbutton switch 7S4, bus 3′. Relay 7K3 is thus energized, closing its two sets of normally-open contacts 7K3A and 7K3B. Closing of contacts 7K3A, which are in series with the primary 37 of buzzer transformer 7T1 between buses 2′ and 3′, operates the buzzer of bell 7I13 to attract the attention of operators or maintenance men at the terminal station. Closing of contacts 7K3B completes a holding circuit for relay 7K3, as follows: Bus 2′, contacts 7K3B, 7K3 winding, switch 7S4, bus 3′. Relay 7K3 remains energized and contacts 7K3A thereof remain closed to operate buzzer 7I13 continuously, until the attendant or operator at the terminal station manually opens switch 7S4, in series with the winding of relay 7K3, to open the circuit between the lower end of such winding and bus 3′.

Closing of contacts 7K2C completes an obvious energization circuit for commutator driving motor 7M1, from buses 2′ and 3′. The combination of commutator segments X1 and Y, which are connected together by the right-hand set of commutator brushes driven by motor 7M1, is connected in parallel with contacts 7K2C. These commutator segments are exactly similar to the similarly-numbered segments in Fig. 1 and therefore function in exactly the same way, that is, to maintain the motor 7M1 energized and in operation through a full cycle or revolution of the commutator 7A1. The tone pulse transmitted when the brushes of commutator 6A1 contact segment Z may be termed a "start pulse," since this pulse received at the terminal station starts operation of the indicating mechanism thereat.

Rotation of the commutator 7A1 will first cause voltage to be applied to the operating winding of relay 7K4 through commutator segment Z which is adjacent the upper conducting section of segment X3, which segment has two entirely independent conducting sections separated by a nonconducting or insulating section. This circuit may be traced as follows: Bus 2′, upper section of segment X3, left-hand commutator brushes, commutator segment Z, 7K4 winding, bus 3′. Energization of 7K4 opens its normally-closed contacts 7K4A, which are connected in series between the positive terminal of a source of unidirectional potential (having a value of 250 volts, for example), through a resistor 42, and a direct current bus 55 which supplies a unidirectional voltage to a series of twelve neon glow lamps 43 to 54, inclusive. One electrode of each of these neon lamps is connected to ground, as is the negative terminal of the unidirectional potential source, while the other electrode of each lamp is connected to bus 55 through a separate corresponding resistor for each lamp, these resistors being numbered 56 to 67, inclusive. In order to stabilize the voltage on bus 55 with respect to ground, a voltage-regulator gaseous glow tube 69, such as a type OB2 tube, has one of its electrodes connected to bus 55 and its other electrode connected to ground.

The unidirectional voltage applied from bus 55 through the respective resistors to each neon lamp is held to a sufficiently low value such that the lamps will not be lit from this voltage alone, but this voltage will cause the lamps to remain lit, once they are lit by the application of a high voltage pulse through the commutator segments, in a manner to be described hereinafter.

The energization of relay 7K4 through commutator segment Z opens contacts 7K4A to remove the positive voltage from bus 55, which is connected in series with such contacts, to extinguish any of the neon lamps 43—54 which were previously lit, thus wiping off any previous lamp indications showing on these lamps.

The commutator 7A1 at the terminal station of Fig. 2, driven by motor 7M1, is designed to be rotated in synchronism with the commutator 6A1 at the repeater station of Fig. 1, driven by motor M2. As the commutator 7A1 is thus driven in synchronism with the transmitting commutator 6A1, the left-hand brushes of commutator 7A1 will connect voltage successively from the positive unidirectional terminal to segments 1, A, 2, B, 3, C, 4, D, 5 and 6 through a resistor 68, relay contacts 7K2A if closed, and the lower section of commutator segment X3, which the left-hand set of commutator brushes engages. The ungrounded electrode of lamp 43 is connected directly to commutator segment 1. The ungrounded electrode of lamp 49 is connected directly to commutator segment A. The ungrounded electrode of lamp 44 is connected directly to commutator segment 2. The ungrounded electrode of lamp 50 is connected directly to commutator segment B. The ungrounded electrode of lamp 45 is connected directly to commutator segment 3. The ungrounded electrode of lamp 51 is connected directly to commutator segment C. The ungrounded electrode of lamp 46 is connected directly to commutator segment 4. The ungrounded electrode of lamp 52 is connected directly to commutator segment D. The ungrounded electrode of lamp 47 is connected directly to commutator segment 5. The ungrounded electrode of lamp 48 is connected directly to commutator segment 6.

The reception of each 2800-cycle fault tone signal pulse from the repeater station of Fig. 1 energizes relay 7K2 (which is connected to the output of the fault tone receiver amplifier SB), closing its contacts 7K2A which are in series in the circuit to the lower section of commutator segment X3. If a fault tone pulse is received during the time interval assigned to any of the commutator segments 1, A, 2, B, 3, etc., that is, during the time the left-hand commutator brushes are contacting a particular segment, a relatively high (150 volts) unidirectional voltage will be applied to the neon lamp connected to that particular segment. In Fig. 2 as in Fig. 1, the commutator segments 1, 2, 3, 4, 5 and 6 are used for station identifying information, while the commutator segments A, B, C and D are used for fault identifying information. Now, assume that the repeater station of Fig. 1 is transmitting fault indicating signals; it will be recalled that the station identifying code for this station was set up as #12. Therefore, a fault tone pulse will be transmitted during the time interval assigned to segment 1 in Fig. 1 and will be received during the time interval assigned to segment 1 in Fig. 2. Therefore, during this time interval a circuit as follows will be completed for applying a relatively high voltage to the neon lamp 43 connected to segment 1: Positive terminal of the 250-volt source, resistor 68, contacts 7K2A (closed because a 2800-cycle fault tone is being received at this time), lower section of commutator segment X3, left-hand set of commutator brushes, commutator segment 1, ungrounded electrode of lamp 43. This high voltage pulse received through segment 1 is sufficient to cause lamp 43 to light. After the left-hand set of commutator brushes passes segment 1, lamp 46 will be caused to remain lit by the positive unidirectional voltage applied to the ungrounded electrode thereof from bus 55 through resistor 56. This latter unidirectional voltage is held to a value sufficiently low so that the neon lamps will not light unless they have received a high voltage pulse through the corresponding commutator segment, but this voltage is sufficiently high to maintain them lit, once they are lit by such a high voltage pulse. Similarly, for any of the other commutator segments A, 2, B, 3, C, 4, D, 5 and 6, if a tone pulse is received during the time interval assigned to any of these particular segments, that is, during the time that the left-hand set of commutator brushes is engaging a particular segment, relay contacts 7K2A will be closed during such interval to apply a high voltage pulse to the corresponding neon lamp through the respective commutator segment, lighting such lamp; such lamp will remain lit, once it is initially lit, due to the unidirectional voltage applied thereto from bus 55 through the corresponding resistors 57, 58, 59, etc.

By the above-described action, lamps 43 through 52 will produce and hold an indication of the particular repeater station at which trouble or a fault has occurred and will also indicate the nature of the trouble or fault. To give an example, if a receiver fault has occurred at the repeater station of Fig. 1, which station has a station identifying code of 12, tone pulses will be transmitted from the station of Fig. 1, and received at the terminal station of Fig. 2, during the time intervals apportioned to comutator segments 1, A and 2. Therefore, during the cycle of operation of receiving commutator 7A1, neon lamps 43, 49 and 44 will be lit for this example. These lamps or any other lighted lamps will remain lit until they are extinguished or reset manually or automatically. The manual reset is effected by pressing the pushbutton switch 7S2, the normally-open contacts of which are connected between bus 2′ and the lower end of 7K4 winding, so that the operation of switch 7S2 energizes relay 7K4 to open its contacts 7K4A which are in series in the unidirectional voltage circuit which maintains the lamps lit. The automatic reset or extinguishment is effected when another transmission is initiated from the same or from a different repeater station, by energization of relay 7K2 in response to a received fault tone, to again energize motor 7M1 to drive commutator 7A1 (it now being in its original or illustrated position), thus energizing relay 7K4 via commutator segment Z (in the manner previously explained), to open its contacts 7K4A to wipe off or reset the neon lamp indicators 43—52.

For testing the operation of the receiving and indicating mechanism, a pushbutton switch 70, having a pair of normally-open contacts, is ganged with a pushbutton switch 71, also having a pair of normally-open contacts. The contacts of switch 70 are connected across contacts 7K2C which are the circuit-closing contacts for motor 7M1; closing of the contacts of switch 70 therefore initiates operation of the commutator driving motor, causing it to go through its cycle of operation. The contacts of switch 71 are connected across contacts 7K2A which are the lighting circuit contacts for neon lamps 43—52; closing of the contactr of switch 71 therefore causing lighting of such lamps as the left-hand commutator brushes engage in succession commutator segments 1, A, 2, B, 3, etc.

An additional circuit is provided to indicate by means of a neon lamp 53 the failure of a receiver associated with the terminal station. Relay 7K5 is quite similar to relay 6K2 of Fig. 1, except that the former is not provided with a time delay action. The upper end of the operating coil of relay 7K5 is connected to bus 2′, while the lower end of this coil is connected to a suitable fault-responsive device in the receiver/modulator at the terminal station. The fault-responsive device operates, in response to a fault in the receiver, to connect the lower end of the coil of 7K5 to bus 3′. Thus, when the receiver at the terminal station fails, relay 7K5 is energized to close its sets of normally-open contacts 7K5A, 7K5B and 7K5C. Contacts 7K5A are in a series circuit between bus 2′ and the upper end of relay 7K3 coil, so that closing of these contacts energizes the ringing relay 7K3 to operate buzzer 7I13 to attract the attention of operators or maintenance men at the terminal station. The closing of contacts 7K5C completes an energization circuit from bus 3′ to certain auxiliary or stand-by equipment, for example, a stand-by receiver.

Receiver indicator neon lamp 53 has one electrode grounded and the other electrode connected through contacts 7K5B if closed and resistor 72 to the positive terminal of the 250-volt, unidirectional source. Therefore, closing of contacts 7K5B causes a high positive unidirectional lighting voltage to be applied to lamp 53, lighting this lamp. Lamp 53 is caused to remain lighted, even after contacts 7K5B are opened, by the positive unidirectional voltage applied to the ungrounded electrode thereof from bus 55 through resistor 66. This latter voltage is sufficiently high to maintain lamp 53 lit, once it is lit by a high voltage derived from the source via contacts 7K5B, but is not sufficient to initially light said lamp.

Another circuit is provided to indicate by means of a neon lamp 54 the failure of a transmitter associated with the terminal station. Relay 7K6 is quite similar to relay 6K1 of Fig. 1. The lower end of the operating coil of relay 7K6 is connected to a suitable fault-responsive device in the transmitter at the terminal station, while the upper end of this relay coil is connected to the positive D. C. potential supply lead 250 volts, for example through a potentiometer as illustrated. The fault-responsive device operates, in response to a fault in the transmitter, to connect the lower end of the coil of 7K6 to ground. Thus, when the transmitter at the terminal station fails, relay 7K6 is energized to close its set of normally-open contacts 7K6A, 7K6B and 7K6C. Contacts 7K6A are in a series circuit between bus 2′ and the upper end of relay 7K3 coil, so that closing of these contacts energizes the ringing relay 7K3 to operate buzzer or bell 7I13 to attract the attention of operators or maintenance men at the terminal station. The closing of contacts 7K6C completes an energization circuit from bus 3′ to certain auxiliary or stand-by equipment, for example a stand-by transmitter.

Transmitter indicator neon lamp 54 has one electrode grounded and the other electrode connected through contacts 7K6B if closed and resistor 73 to the positive terminal of the 250-volt, unidirectional source. Therefore, closing of contacts 7K6B causes a high positive unidirectional lighting voltage to be applied to lamp 54, lighting this lamp. Lamp 54 is caused to remain lit, even after contacts 7K6B are opened, by the positive unidirectional voltage applied to the ungrounded electrode thereof from bus 55 through resistor 67. This latter voltage is sufficiently high to maintain lamp 54 lit, once it is lit by a high voltage derived from the positive source via contacts 7K6B, but is not sufficient to initially light said lamp.

Lamps 53 and 54, if lit, since they are supplied with "maintaining" voltage from bus 55 will remain lit until they are extinguished or reset in response to the energization of relay 7K4 and the consequent opening of its contacts 7K4A; this relay, as above described, may be energized manually by the pressing of button 7S2 or automatically when a fault transmission is initiated from a repeater station.

A pushbutton switch 74, having a pair of normally-open contacts, and a pushbutton switch 75, also having a pair of normally-open contacts, are ganged with switches 70 and 71 in order to complete the testing circuits for the receiving and indicating mechanism. The contacts of switch 74 are connected across contacts 7K5B which are the lighting circuit contacts for neon lamp 53; closing of the contacts of switch 74 therefore causes lighting of such lamp. The contacts of switch 75 are connected across contacts 7K6B which are the lighting circuit contacts for neon lamp 54; closing of the contacts of switch 75 therefore causes lighting of such lamp.

It will be noted that there are the same number of commutator segments (eleven, in the example illustrated) in the coding commutator 6A1 at the repeater station and in the indicating commutator 7A1 at the terminal station, these segments being numbered Z, 1, A, 2, B, 3, C, 4, D, 5 and 6 in Figs. 1 and 2. The keying commutator 6A1 is driven through one revolution for the transmission of the coded signal, while the indicating comutator 7A1 is also driven through one revolution for the indication of the coded signal being received. To prevent erroneous indications being given at the terminal station, it is of course necessary that the commutators 6A1 and 7A1 be driven in synchronism. The repeater stations and the terminal stations are generally separated some distance from each other and depend on local power supplies, the frequencies of which may be slightly different, for energizing their respective commutator-driving motors. Therefore, although these motors at the repeater (transmitting) station and the terminal (receiving) station are started simultaneously, there may be slight variations in their speeds which would cause a slight out-of-phase condition of the two commutators to arise during their single revolutions, causing improper indications to be made at the terminal station.

To allow for a greater tolerance in motor speeds and hence supply frequencies, while yet providing correct indications at the receiving (terminal) station, the sum of the lengths of each sending (repeater station) commutator segment and of the corresponding receiving (terminal station) commutator segment is made greater as the angular distance from the start position on the commutators increases. Specifically, all the commutator segments at the transmitting station have the same angular width, while those at the receiving station have angular widths which increase as the angular distance from the start position increases. In this manner, even though the rotating parts of the two commutators get slightly out of phase, enough leeway is provided so that the connection at the receiving commutator will in all cases be made to the proper indicator lamp when the connection to the corresponding commutator segment is made at the sending commutator. This procedure, of providing nonuniform-angular-width segments at the receiving commutator and uniform-angular-width segments at the sending commutator, is allowable because a complete coded signal is transmitted in a single revolution, and is desirable since the further the respective sending and receiving brushes are from the start position, the greater is the distance they are likely to be out of step. This procedure may be thought of as decreasing the length of the transmitted tone pulse, if any, with respect to the length of time that connection is made to the corresponding receiver indicator lamp, from the start position to the stop position of two substantially-synchronously-driven commutators, one at the transmitting (repeater) station and the other at the receiving (terminal) station.

What we claim as our invention is:

1. In a radio relaying system having a pair of terminal stations and a plurality of intermediate repeater stations for relaying intelligence in both directions between said terminal stations, a fault detecting and transmitting arrangement at each repeater station including an oscillator of a single common predetermined frequency, a motor-driven contact device for keying said oscillator, means including the normally-closed contacts of a relay for energizing the motor in response to the appearance of a fault at the repeater station and for causing the contacts of said device to key said oscillator in a code representative of the type of fault and of the particular repeater station at which the fault has appeared, means for transmitting the coded oscillatory energy thus produced through the relaying system in both directions to the two terminal stations, said coded oscillatory energy being superimposed upon the intelligence being relayed, an amplifier tuned to said common predetermined frequency, means coupling the input of said amplifier to the output of a radio receiver at the repeater station, and means coupling said relay to the output of said amplifier to open said normally-closed contacts in response to such output.

2. In a radio relaying system having a pair of terminal stations and a plurality of intermediate repeater stations for relaying intelligence in both directions between said terminal stations, a fault detecting and transmitting arrangement at each repeater station including an oscillator of a single common predetermined frequency, a motor-driven contact device for keying said oscillator, means including the normally-closed contacts of a relay for energizing the motor in response to the appearance of a fault at the repeater station and for causing the contacts of said device to key said oscillator in a code representative of the type of fault and of the particular repeater station at which the fault has appeared, means for transmitting the coded oscillatory energy thus produced through the relaying system in both directions to the two terminal stations, said coded oscillatory energy being superimposed upon the intelligence being relayed, and means for operating said relay to open said normally-closed contacts in response to the reception at the repeater station of energy of said predetermined frequency; and a fault indicating arrangement at each of said terminal stations including means for translating the received coded oscillatory energy into visible depictions indicative of the particular repeater station originating such coded energy and of the type of fault thereat.

3. An arrangement as defined in claim 2, wherein the translating means at each of the terminal stations includes a plurality of indicating lamps, and a motor-driven contact device similar to the contact device at the repeater stations and driven in synchronism therewith, for producing selective illumination of certain ones of said plurality of lamps.

4. In a radio relaying system having a pair of terminal stations and a plurality of intermediate repeater stations for relaying intelligence in both directions between said terminal stations, a fault detecting and transmitting arrangement at each repeater station including an oscillator of a single common predetermined frequency, a motor-driven contact device for keying said oscillator, means including the normally-closed contacts of a relay for energizing the motor in response to the appearance of a fault at the repeater station and for causing the contacts of said device to key said oscillator in a code representative of the type of fault and of the particular repeater station at which the fault has appeared, means for transmitting the coded oscillatory energy thus produced through the relaying system in both directions to the two terminal stations, said coded oscillatory energy being superimposed upon the intelligence being relayed, an amplifier tuned to said common predetermined frequency, means coupling the input of said amplifier to the output of a radio receiver at the repeater station, and means coupling said relay to the output of said amplifier to open said normally-closed contacts in response to such output; and a fault indicating arrangement at each of said terminal stations including means for translating the received coded oscillatory energy into visible depictions indicative of the repeater station originating such coded energy and of the type of fault thereat.

References Cited in the file of this patent

UNITED STATES PATENTS

| | | |
|---|---|---|
| 1,342,635 | Lewis | June 8, 1920 |
| 1,844,648 | Farley | Feb. 9, 1932 |
| 2,146,576 | Haselton | Feb. 7, 1939 |
| 2,168,460 | Watson | Aug. 8, 1939 |
| 2,289,517 | Muehter | July 14, 1942 |
| 2,337,441 | Atkinson | Dec. 21, 1943 |
| 2,424,571 | Lang | July 29, 1947 |
| 2,460,789 | Thompson | Feb. 1, 1949 |
| 2,524,861 | Wallace et al. | Oct. 10, 1950 |
| 2,543,869 | Rees | Mar. 6, 1951 |
| 2,567,226 | McWhirter | Sept. 11, 1951 |